March 31, 1925.  1,532,057

I. LYCHYJ

AUTOMATIC MOUSE AND RAT TRAP

Filed Aug. 23, 1923  3 Sheets-Sheet 1

INVENTOR.
Iwan Lychyj
BY
George C. Heinitz
ATTORNEY

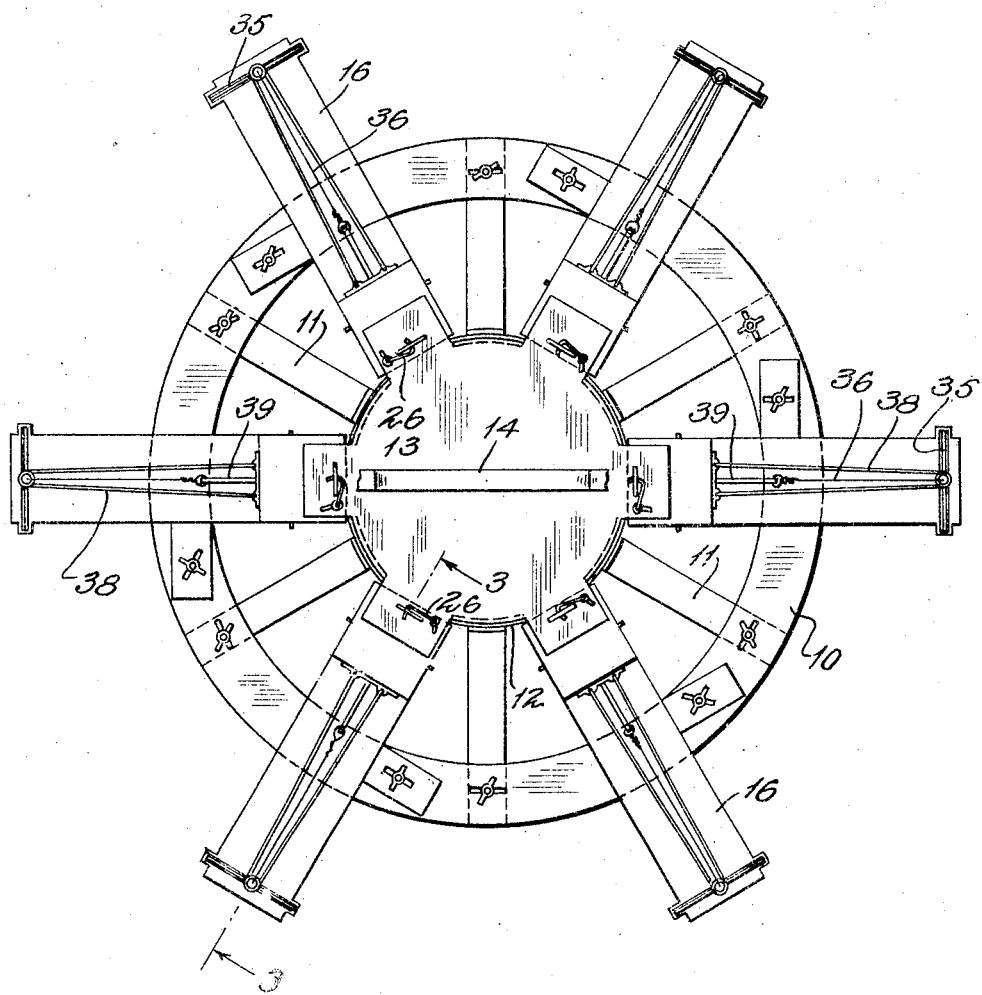

March 31, 1925.  1,532,057
I. LYCHYJ
AUTOMATIC MOUSE AND RAT TRAP
Filed Aug. 23, 1923   3 Sheets-Sheet 3
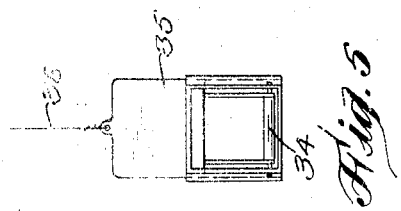
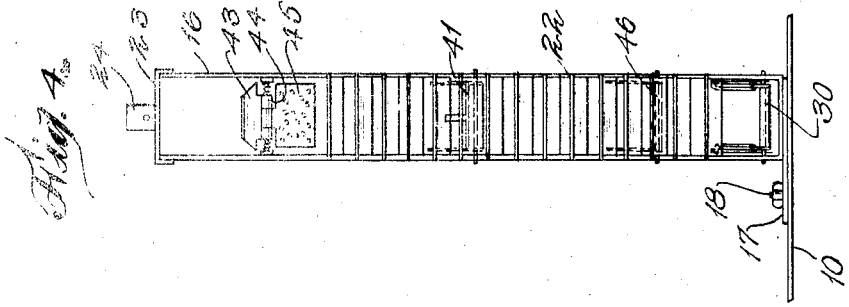
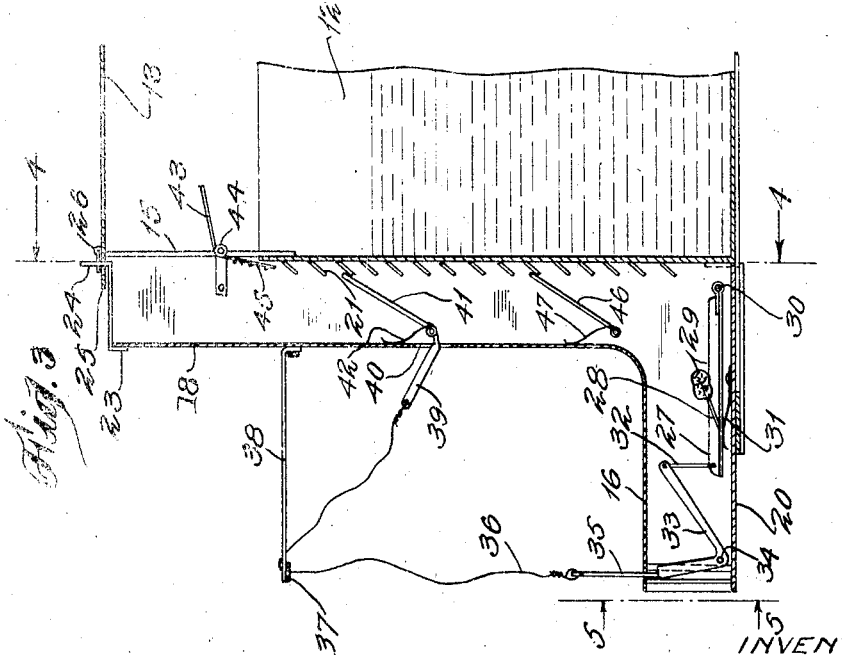
INVENTOR
Iwan Lychyj
BY
George C. Hemjoks
ATTORNEY Patented Mar. 31, 1925.

1,532,057

UNITED STATES PATENT OFFICE.

IWAN LYCHYJ, OF WINDSOR, ONTARIO, CANADA.

AUTOMATIC MOUSE AND RAT TRAP.

Application filed August 23, 1923. Serial No. 658,961.

*To all whom it may concern:*

Be it known that I, IWAN LYCHYJ, a citizen of Ukrainia, residing at Windsor, Province of Ontario, and Dominion of Canada, have invented certain new and useful Improvements in Automatic Mouse and Rat Traps, of which the following is a specification.

This invention relates to improvements in traps, particularly traps for animals of the rodent type, and it is the principal object of my invention to provide a trap for catching and disposing of a plurality of rats or mice.

Another object of my invention is the provision of a trap which is automatically closed by the animal lured into the trap.

A further object of my invention is the provision of a trap which is automatically set again by the animal caught therein.

Other objects of my invention and advantages thereof will become more fully known as the description thereof proceeds, and will then specifically be pointed out in the appended claim.

In the accompanying drawings, forming a material part of this disclosure:

Figure 2 is a top plan view thereof.

Figure 3 is a detail view of one of the shafts in longitudinal section on line 3—3 of Figure 2.

Figure 4 is a rear view thereof seen along line 4—4 of Figure 3.

Figure 5 is an end view of the lower part of a shaft seen along line 5—5 of Figure 3.

Figure 1:
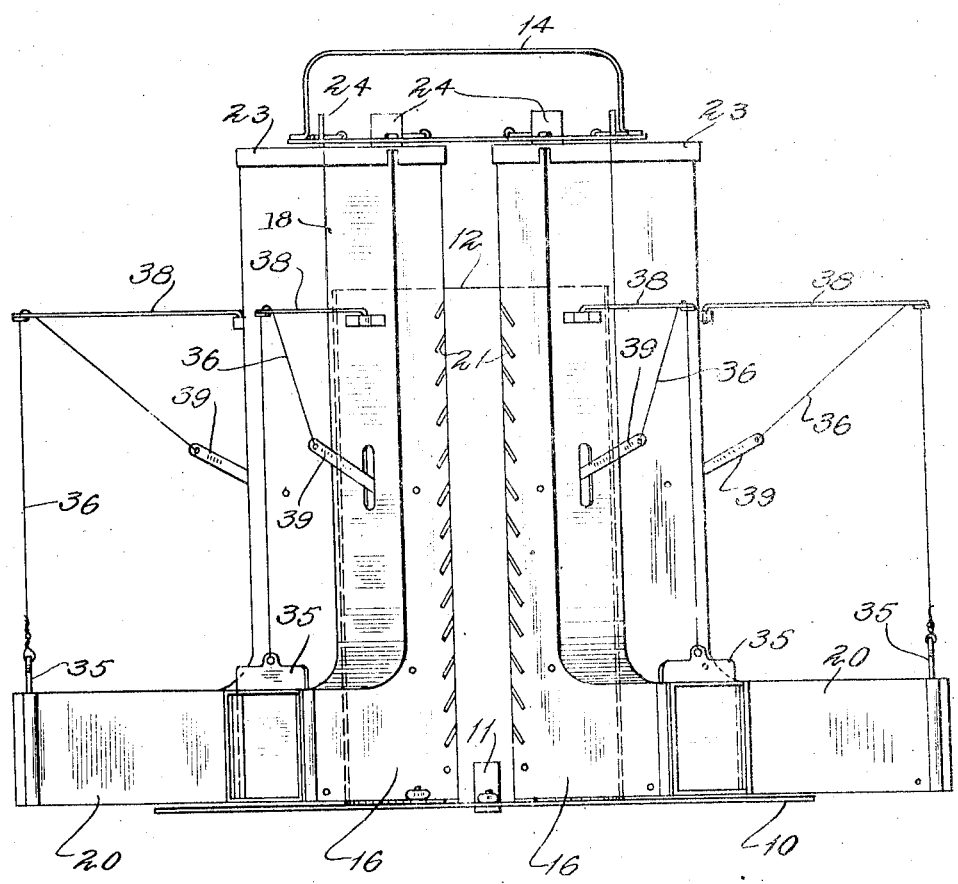
Figure 1 is a front elevation of a trap constructed according to my invention.

The rodent trap comprises a bottom plate 10, preferably in the form of a so-called spider to which the outer ends of strips 11 are secured in any suitable manner, the inner ends of which are attached to the outer wall of a tank 12 adapted to be filled with water or similar fluid. A cover 13 provided with a handle 14 is secured to and spaced from the tank by means of a plurality of strips 15.

A plurality of shafts 16 of a form best illustrated in Figure 3, is secured on the spider 10 by means of their lateral foot flanges 17 and suitable fastening means 18. Each of these shafts extends above the upper edge of the tank 12.

The construction of all shafts is alike, and it will therefore be sufficient to describe one of them in order to make it understood.

Each of the shafts 16 comprises a longer, vertical branch 18, and a smaller, horizontal branch 20. The rear walls of shafts 16 are open and engage the outer wall of the tank 12. A plurality of inclined slots 21 are provided in the rear edges of the side walls of each shaft, and are adapted to receive and firmly hold a plurality of rungs 22 to form a ladder for facilitating the ascent of the rodents within the shafts, as will hereinafter be more fully described.

The covers 23 for the upper ends of shaft 16 have an upstanding inner lip 24 which is passed through a slotted flap 25 of cover 13, and hooks and eyes 26.

In the horizontal branch of each shaft 16 a platform 27 carrying a holder 28 for the bait 29 is hingedly secured at its rear end by means of a pin 30. A spring 31 secured at one end to the bottom of the shaft and engaging with its free end the lower face of platform 27 tends to normally keep its front end in elevated position.

Links 32 attached with one end to the front end of platform 27, have their other ends attached to one pair of arms of bell crank levers 33 fulcrumed as at 34 to the walls of shaft 16, while the upper free ends of the other arms of said bell crank levers normally support a trap-door 35 to the upper end of which a cable 36 is secured, which is guided intermediate its ends through an eye 37 at the front end of a bar 38 secured to the outer wall of shaft 16. The other end of cable 36 is secured to the outer end of a lever 39 extending with its angular end through an opening 40 in the front wall of the shaft 16. To the inner angular end of lever 39 is secured a platform 41, and a spring 42 secured at one end to said platform and engaging with its other end the inner front wall of shaft 16 has the tendency to press the platform into the position illustrated in Figure 3 in which it closes the shaft.

A platform 43 is pivotally secured intermediate its ends as at 44 to the shaft 16 above the tank 12 and its weighted and corrugated rear arm 45 tends to hold platform 43 normally elevated but allows a tilting of the same under the weight of an animal.

Another platform 46 is pivotally secured at its inner end within shaft 16 between the bait platform 27 and platform 41, while a spring 47 is normally keeping the platform 46 in its shaft closing position.

The device operates as follows:—

In the normal position of the bait plate 27 the trap door rests with its lower edge on top of the front arms of bell crank lever 33.

When the animal lured by the bait 29 enters upon platform 27, its own weight will depress said platform and move the bell crank lever so that its arm supporting the trap door will be moved and the trap door losing its support will fall and close the mouth of the shaft behind the animal. The rodent seeking an avenue of escape will climb towards the top of shaft 16 on the rungs 22, and pass plate 46 which by the action of spring 47 will close behind the animal. Further ascending on rungs 22, the animal will pass platform 41, which behind the same will take up its normal position by virtue of spring 42 closing the shaft 16. The operation of platform 41 by the animal will tauten cable 36 and raise the trap door permitting it to take up its former position on top of the front arms of bell crank lever 33, so that the trap is set again for a new catch. The animal having passed door 41 will try to escape over platform 43, the corrugations of weight 45 facilitate its ascent, and upon reaching platform 43 the animal will be thrown into the water in tank 12 as its own weight will produce the proper tilting of platform 43.

If it is desired to remove the animals caught in the tank 12, the hooks 26 are released from their engagement with lip 24 and the means 18 fastening the flaps 17 of the shafts 16 to the spider 10 are also released so that the cover 13 and the tank can be removed by means of handle 14 and the dead animals are removed from the tank by means of suitable tools.

Changes may be made in the general construction and arrangement of parts without departing from the spirit and scope of my invention as defined by the appended claim.

Having thus described my invention what I claim as new and desire to secure by Letters Patent is:

A rodent trap, comprising a shaft having a horizontal and a vertical branch, a door for closing the entrance to the horizontal branch, a bait holding platform arranged in the horizontal branch and pivotally supported at the end remote from the entrance to such branch, a spring underlying that end of the platform adjacent the horizontal branch entrance to support the platform in operative position, an angle lever pivotally mounted in the horizontal branch adjacent the door, one angle of said lever being adapted to underlie and support the door in elevated position, and a connection between the other end of said angle lever and the free end of the platform, a trap door pivotally supported in and normally closing the vertical branch of the shaft, an arm carried by said trap door and projecting beyond the vertical branch, a flexible connection terminally secured to said arm and to the entrance door, and an intermediate guiding support for said flexible connection, whereby to cause the operative movement of the trap door to exert a raising pull on the entrance door.

In testimony whereof I have affixed my signature.

IWAN LYCHYJ.